(12) United States Patent
Chang-Shorland et al.

(10) Patent No.: US 12,513,183 B2
(45) Date of Patent: Dec. 30, 2025

(54) REAL-TIME RANSOM AND SECURITY BREACH DETECTION AND PREVENTION

(71) Applicant: IMPERVIOUS WORLD CORP., Miami, FL (US)

(72) Inventors: Chao Chang-Shorland, New York, NY (US); Allen Alishahi, New York, NY (US)

(73) Assignee: IMPERVIOUS WORLD CORP., Miami, FL (US)

( * ) Notice: Subject to any disclaimer, the term of this patent is extended or adjusted under 35 U.S.C. 154(b) by 0 days.

(21) Appl. No.: 18/645,084

(22) Filed: Apr. 24, 2024

(65) Prior Publication Data
US 2025/0337768 A1    Oct. 30, 2025

(51) Int. Cl.
*H04L 9/40* (2022.01)
(52) U.S. Cl.
CPC ...... *H04L 63/1441* (2013.01); *H04L 63/1416* (2013.01)
(58) Field of Classification Search
CPC .......................... H04L 63/1441; H04L 63/1416
USPC ......................................................... 726/22
See application file for complete search history.

(56) References Cited

U.S. PATENT DOCUMENTS

| | | | | |
|---|---|---|---|---|
| 8,572,743 | B2* | 10/2013 | Di Crescenzo | G06F 21/565 713/188 |
| 11,522,839 | B1* | 12/2022 | Feeser | H04L 67/08 |
| 11,750,371 | B1* | 9/2023 | Mudge | H04L 9/0643 713/189 |
| 2008/0134337 | A1* | 6/2008 | Crescenzo | G06F 21/565 726/24 |
| 2023/0117901 | A1* | 4/2023 | Pescatore | G06F 8/433 726/23 |

* cited by examiner

*Primary Examiner* — Teshome Hailu
(74) *Attorney, Agent, or Firm* — Sterne, Kessler, Goldstein & Fox, P.L.L.C.

(57) ABSTRACT

The real-time ransom and security breach detection and prevention system empowers users and system administrators by providing real-time threat detection and prevention by detecting any phishing links, malicious executables and objects, and manipulation of authentication tokens that could potentially escalate a threat into ransom attacks, security breaches or other cyber attacks, and take immediate action by blocking and reporting the potential security breach before escalating into a real attack. The real-time ransom and security breach detection and prevention system generates a first hash of the link, executable, object, or authentication token. Utilizing this generated first hash, the real-time ransom and security breach detection and prevention system calculates a second hash upon user interaction or at runtime and compares the two unique hashes to determine if the link, executable, object, or authentication token is corrupt and terminates the gateway to prevent the cyber-threat from infecting the system.

21 Claims, 5 Drawing Sheets

REAL-TIME RANSOM AND SECURITY BREACH DETECTION AND PREVENTION

BACKGROUND

Field

The present invention is in the technology of Cybersecurity systems, and pertains more particularly to a system for real-time ransom and security breach detection and prevention system, as well as ransom and other security breach detection and prevention, within various applications.

Related Art

There have been significant advances within the cybersecurity industry over the last decade. One of those advances is the development and implementation of endpoint detection and remediation systems and isolated browsers. Both solutions, however, fail to properly detect and correct security breaches in real-time, especially with respect to URL link validation such as phishing links, malicious object, codes and executable identification, as well as unauthorized authentication token use and manipulation prevention. Traditionally, a user's computer has been protected from malicious files, such as, viruses, malware, ransomware, spyware, worms, and Trojan horses by relying on post infection detection. This reactionary method, which waits for the malicious files to infect a device after a URL link is selected, risks each device, and any network attached the devices, at the expense of detecting the potential cybersecurity threat.

These reactionary anti-virus systems, such as endpoint detection and remediation ("EDR") systems are designed to monitor a device's activity to determine if an action has introduced a malicious file into the system. For example, the reactionary anti-virus system will monitor the activity within the system files of a device, such as the system log files, program files, etc. to determine if there is any suspicious activity. This monitoring process takes time. A traditional EDR can take up to 16 days to detect and correct a security breach according to the Mandiant M-Trends 2023 report. During this time, the malicious files may have already performed the action it was designed to carry out, whether it was retrieving a specific file, or installing ransomware. While modern EDR systems have used a kernel level approach that has significantly speed up the time of detection, the average response time is still 15-30 minutes.

Due to this, most network operator and IT professionals use multiple cybersecurity tools to reduce the likely of a security breach. One additional tool is the implementation of browser isolation systems. Instead of monitoring a device's or network's activity to detect security breaches, a browser isolation system creates a virtual machine or isolated web-based environment that allows users to operate their device within a safe environment. Examples of a browser isolation system are Zscaler, Proofpoint, Netscope, etc. Browser isolation systems require IT admins to maintain a whitelist or blacklist of various URL links. A URL link's inclusion on one of these lists will determine what action the system takes. If the system determines that the URL link is potentially malicious, the virtual computer environment will be started and the URL link will be accessed using a browser within this safe environment.

While a browser isolation system does prevent security breaches, it still does not contain every potential threat. Because the browser isolation systems require the whitelist and blacklists to be up to date, there is a chance that newly created URLs will bypass the system. Additionally, shortened URLs will either by entirely blocked or will be entirely allowed since the URL link that is analyzed typically does not resemble the redirected URL link. It is not foolproof and may still be susceptible to certain types of attacks, such as side-channel attacks or vulnerabilities in the isolation platform itself. Furthermore, a browser isolation system can lead to performance overhead affecting the user experience, especially for resource-intensive tasks. Running multiple isolated browser instances concurrently can consume significant system resources, particularly memory and CPU, which may impact overall system performance and scalability. Implementing and managing such system can be complex and costly, requiring specialized infrastructure, software licenses, and ongoing maintenance efforts. There are additional usability, compatibility and integration challenges and limitations that could result in poor adoption of a browser isolation system. For example, certain web applications or plugins may not work properly within the isolated environment, leading to compatibility issues and potential usability constraints. Interaction between isolated browsing sessions and local applications or devices may be restricted, limiting functionality for certain use cases that require seamless integration.

These security vulnerabilities within current EDR and browser isolation systems have allowed cybersecurity attacks, such as a ransomware attack, to increase year over year because they do not address the most common type attack, a phishing attack. A ransomware attack is a type of cybersecurity attack that is caused by a type of malware that encrypts, or renders inaccessible, the infected data until a ransom is paid to the malicious actor. These attacks are primarily caused by phishing attempts, which lure unsuspecting employees into selecting a URL link within an electronic message. During a ransomware attack, companies can be forced to pay ransoms ranging from tens of millions to hundreds of millions of dollars. Ransomware attacks typically aim to take control of important files in a computing system by cryptographic encryption, with such files including user files in home folders and system files in system folders. In 2022 alone, there were around 500 million ransomware attempts. A ransomware attack can result in significant disruptions to efficiency and operations. Both of which will lead to a significant increase in operating costs.

Additionally, there is no guarantee that paying the malicious actor of the ransomware attack will result in the return of stolen or uncorrupted files. Despite efforts to recover data, it's common for organizations to find that some data and systems are never fully restored to their pre-attack state. After paying a ransom demanded by the attackers, organizations may discover that their compromised data is listed for sale on the dark web. This exposes sensitive information to further exploitation and puts affected individuals and organizations at continued risk of harm, such as identity theft or further attacks. For these reasons, preventing ransomware attacks is increasingly important for numerous industries, particularly those that manage critical infrastructure, operations, and sensitive data. This includes sectors such as healthcare, banking and finance, legal services, education, and government.

What is clearly needed is a foolproof threat detection and prevention system to real-time detect any phishing links, malicious executables and objects, and manipulation of authentication tokens that could potentially escalate a threat into ransom attacks, security breaches or other cyber attacks, and take immediate action by blocking and reporting the potential security breach before escalating into a real attack.

The system should also be seamless where it comes to user experience and enable operational efficiency without a performance or scalability impact.

BRIEF SUMMARY

In an embodiment, a computer implemented method is provided, comprising receiving by one or more internet-connected devices, a link, storing by the one or more internet-connected devices the link, in response to receiving the link, generating a first hash of the link, storing by the one or more internet-connected devices, the first hash, receiving via the one or more internet-connected devices, a user selection of the link, in response to receiving the user selection of the link, generating a second hash of the selected link, wherein the second hash of the selected link is generated using the selected link, storing, by the one or more internet-connected devices, the second hash, analyzing by the one or more internet-connected devices, the first hash and second hash to determine a likelihood that the link is malicious or benign, wherein the link is determined to be malicious if the first hash does not match the second hash, terminating by the one or more internet-connected devices, a link redirection of the user selected link based the likelihood that the link is malicious or benign, in response to analyzing the first hash and second hash, displaying, by the one or more internet-connected devices, a notification, wherein the notification is based on the likelihood that the link is malicious or benign.

In an embodiment, a computer implemented method further comprises generating by the one or more internet-connected devices, a third hash, wherein the third hash is generated using the selected link's a first HTML code, storing by the one or more internet-connected devices, the third hash, in response to generating the third hash, generating a fourth hash, wherein the fourth hash is generated using a second HTML code, storing by the one or more internet-connected devices, the fourth hash, analyzing by the one or more internet-connected devices, the third hash and fourth hash to determine a likelihood that the link's HTML code is malicious or benign, wherein the link's HTML code is determined to be malicious if the third hash does not match the fourth hash, terminating by the one or more internet-connected devices, a gateway of the user selected link based the likelihood that the link is malicious or benign, in response to analyzing the third hash and fourth hash, displaying, by the one or more internet-connected devices, a notification, wherein the notification is based on the likelihood that the link is malicious or benign.

In an embodiment, a computer implemented method further comprises in response to analyzing the first hash and second hash, generating a first report entry based upon the first hash, the second hash, link, and the likelihood that the link is malicious or benign.

In an embodiment, a computer implemented method further comprises in response to analyzing the third hash and fourth hash, generating a second report entry based upon the third hash, the fourth hash, link, and the likelihood that the link is malicious or benign.

In an embodiment, a computer implemented method further comprises storing, by the one or more internet-connected devices, the first hash, the second hash, link, and the likelihood that the link is malicious or benign on a decentralized block-chain ledger.

In an embodiment, a computer implemented method further comprises storing, by the one or more internet-connected devices, the third hash, the fourth hash, link, and the likelihood that the link is malicious or benign on a decentralized block-chain ledger.

In an embodiment, a computer implemented method further comprises displaying, by a server, a web portal, wherein the web portal includes a dashboard, wherein the dashboard is generated by the first hash, the second hash, link, the likelihood that the link is malicious or benign, and the first report entry.

In an embodiment, a computer implemented method further comprises displaying, by a server, a web portal, wherein the web portal includes a dashboard, wherein the dashboard is generated by the third hash, the fourth hash, link, the likelihood that the link is malicious or benign, and the second report entry.

In an embodiment, a computer implemented method further comprises parsing, by the one or more internet-connected devices, the first HTML code, determining if the parsed first HTML code includes an embedded executable, in response to determining if the parsed first HTML code includes an embedded executable, terminating, by the one or more internet-connected devices, a gateway of the user selected link based the likelihood that the link is malicious or benign.

In an embodiment, the ransom and security breach detection and prevention system comprises one or more internet-connected devices, wherein each of the one or more internet-connected devices, are configured to receive by one or more internet-connected devices, a link, store by the one or more internet-connected devices, the link, in response to receiving the link, generating a first hash of the link, store, by the one or more internet-connected devices, the first hash, receive, via the one or more internet-connected devices, a user selection of the link, in response to receiving the user selection of the link, generating a second hash of the selected link, wherein the second hash of the selected link is generated using the selected link, store, by the one or more internet-connected devices, the second hash, analyze, by the one or more internet-connected devices, the first hash and second hash to determine a likelihood that the link is malicious or benign, wherein the link is determined to be malicious if the first hash does not match the second hash, terminate, by the one or more internet-connected devices, a link redirection of the user selected link based the likelihood that the link is malicious or benign, in response to analyzing the first hash and second hash, displaying, by the one or more internet-connected devices, a notification, wherein the notification is based on the likelihood that the link is malicious or benign.

In an embodiment, the ransom and security breach detection and prevention system comprises wherein each of the one or more internet-connected devices, are further configured to generate, by the one or more internet-connected devices, a third hash, wherein the third hash is generated using the selected link's a first HTML code, store, by the one or more internet-connected devices, the third hash, in response to generating the third hash, generating a fourth hash, wherein the fourth hash is generated using a second HTML code, store, by the one or more internet-connected devices, the fourth hash, analyze, by the one or more internet-connected devices, the third hash and fourth hash to determine a likelihood that the link's HTML code is malicious or benign, wherein the link's HTML code is determined to be malicious if the third hash does not match the fourth hash, terminate, by the one or more internet-connected devices, a gateway of the user selected link based the likelihood that the link is malicious or benign, in response to analyzing the third hash and fourth hash, displaying, by the one or more internet-connected devices, a notification, wherein the notification is based on the likelihood that the link is malicious or benign.

In an embodiment, the ransom and security breach detection and prevention system comprises in response to analyzing the first hash and second hash, generating a first report entry based upon the first hash, the second hash, link, and the likelihood that the link is malicious or benign.

In an embodiment, the ransom and security breach detection and prevention system comprises in response to analyzing the third hash and fourth hash, generating a second report entry based upon the third hash, the fourth hash, link, and the likelihood that the link is malicious or benign.

In an embodiment, the ransom and security breach detection and prevention system comprises storing, by the one or more internet-connected devices, the first hash, the second hash, link, and the likelihood that the link is malicious or benign on a decentralized or distributed block-chain ledger.

In an embodiment, the ransom and security breach detection and prevention system comprises storing, by the one or more internet-connected devices, the third hash, the fourth hash, link, and the likelihood that the link is malicious or benign on a decentralized or distributed block-chain ledger.

In an embodiment, the ransom and security breach detection and prevention system comprises storing, by the one or more internet-connected devices, the first hash, the second hash, link, and the likelihood that the link is malicious or benign on an immutable database.

In an embodiment, the ransom and security breach detection and prevention system comprises storing, by the one or more internet-connected devices, the third hash, the fourth hash, link, and the likelihood that the link is malicious or benign on an immutable database.

In an embodiment, the ransom and security breach detection and prevention system comprises displaying, by a server, a web portal, wherein the web portal includes a dashboard, wherein the dashboard is generated by the first hash, the second hash, link, the likelihood that the link is malicious or benign, and the first report entry.

In an embodiment, the ransom and security breach detection and prevention system comprises displaying, by a server, a web portal, wherein the web portal includes a dashboard, wherein the dashboard is generated by the third hash, the fourth hash, link, the likelihood that the link is malicious or benign, and the second report entry.

In an embodiment, the ransom and security breach detection and prevention system comprises parsing, by the one or more internet-connected devices, the first HTML code, determining if the parsed first HTML code includes an embedded executable, in response to determining if the parsed first HTML code includes an embedded executable, terminating, by the one or more internet-connected devices, a gateway of the user selected link based the likelihood that the link is malicious or benign.

In an embodiment, the non-transitory computer-readable device having instructions stored thereon that, when executed by at least one computing device, cause the at least one computing device to perform operations comprising receiving by one or more internet-connected devices, a link, storing by the one or more internet-connected devices the link, in response to receiving the link, generating a first hash of the link, storing by the one or more internet-connected devices, the first hash, receiving via the one or more internet-connected devices, a user selection of the link, in response to receiving the user selection of the link, generating a second hash of the selected link, wherein the second hash of the selected link is generated using the selected link, storing, by the one or more internet-connected devices, the second hash, analyzing by the one or more internet-connected devices, the first hash and second hash to determine a likelihood that the link is malicious or benign, wherein the link is determined to be malicious if the first hash does not match the second hash, terminating by the one or more internet-connected devices, a link redirection of the user selected link based the likelihood that the link is malicious or benign, in response to analyzing the first hash and second hash, displaying, by the one or more internet-connected devices, a notification, wherein the notification is based on the likelihood that the link is malicious or benign.

In an embodiment, the non-transitory computer-readable device having instructions stored thereon that, when executed by at least one computing device, cause the at least one computing device to perform operations further comprises generating by the one or more internet-connected devices, a third hash, wherein the third hash is generated using the selected link's a first HTML code, storing by the one or more internet-connected devices, the third hash, in response to generating the third hash, generating a fourth hash, wherein the fourth hash is generated using a second HTML code, storing by the one or more internet-connected devices, the fourth hash, analyzing by the one or more internet-connected devices, the third hash and fourth hash to determine a likelihood that the link's HTML code is malicious or benign, wherein the link's HTML code is determined to be malicious if the third hash does not match the fourth hash, terminating by the one or more internet-connected devices, a gateway of the user selected link based the likelihood that the link is malicious or benign, in response to analyzing the third hash and fourth hash, displaying, by the one or more internet-connected devices, a notification, wherein the notification is based on the likelihood that the link is malicious or benign.

In an embodiment, the non-transitory computer-readable device having instructions stored thereon that, when executed by at least one computing device, cause the at least one computing device to perform operations further comprises in response to analyzing the first hash and second hash, generating a first report entry based upon the first hash, the second hash, link, and the likelihood that the link is malicious or benign.

In an embodiment, the non-transitory computer-readable device having instructions stored thereon that, when executed by at least one computing device, cause the at least one computing device to perform operations further comprises in response to analyzing the third hash and fourth hash, generating a second report entry based upon the third hash, the fourth hash, link, and the likelihood that the link is malicious or benign.

In an embodiment, the non-transitory computer-readable device having instructions stored thereon that, when executed by at least one computing device, cause the at least one computing device to perform operations further comprises storing, by the one or more internet-connected devices, the first hash, the second hash, link, and the likelihood that the link is malicious or benign on a decentralized or distributed block-chain ledger.

In an embodiment, the non-transitory computer-readable device having instructions stored thereon that, when executed by at least one computing device, cause the at least one computing device to perform operations further comprises storing, by the one or more internet-connected devices, the third hash, the fourth hash, link, and the likelihood that the link is malicious or benign on a decentralized or distributed block-chain ledger.

In an embodiment, the non-transitory computer-readable device having instructions stored thereon that, when executed by at least one computing device, cause the at least one computing device to perform operations further comprises storing, by the one or more internet-connected devices, the first hash, the second hash, link, and the likelihood that the link is malicious or benign on an immutable database.

In an embodiment, the non-transitory computer-readable device having instructions stored thereon that, when executed by at least one computing device, cause the at least one computing device to perform operations further comprises storing, by the one or more internet-connected devices, the third hash, the fourth hash, link, and the likelihood that the link is malicious or benign on an immutable database.

In an embodiment, the non-transitory computer-readable device having instructions stored thereon that, when executed by at least one computing device, cause the at least one computing device to perform operations further comprises displaying, by a server, a web portal, wherein the web portal includes a dashboard, wherein the dashboard is generated by the first hash, the second hash, link, the likelihood that the link is malicious or benign, and the first report entry.

In an embodiment, the non-transitory computer-readable device having instructions stored thereon that, when executed by at least one computing device, cause the at least one computing device to perform operations further comprises displaying, by a server, a web portal, wherein the web portal includes a dashboard, wherein the dashboard is generated by the third hash, the fourth hash, link, the likelihood that the link is malicious or benign, and the second report entry.

In an embodiment, the non-transitory computer-readable device having instructions stored thereon that, when executed by at least one computing device, cause the at least one computing device to perform operations further comprises parsing, by the one or more internet-connected devices, the first HTML code, determining if the parsed first HTML code includes an embedded executable, in response to determining if the parsed first HTML code includes an embedded executable, terminating, by the one or more internet-connected devices, a gateway of the user selected link based the likelihood that the link is malicious or benign.

DETAILED DESCRIPTION

The inventors in the present application offer a compre hensive system providing a real-time ransom and security breach detection and prevention system.

The invention in various embodiments and aspects provides an unprecedented speedy, simple and effective real-time ransom and security breach detection and prevention system. The real-time ransom and security breach detection and prevention system in embodiments of the invention empowers IT system administrators and system users to safely browse, open, send, receive, attached, and download URL links. The real-time ransom and security breach detection and prevention system may include a real-time link validation process is provided in embodiments of the invention as well, enabling IT system administrators and system users to safely browse, open, send, receive, attached, and download URL links. The real-time link validation system minimizes the risks that would arise due typical day-to-day interactions between employees internally and externally, while also maintaining workflow efficiencies currently demanded by various industries by hashing URL links to determine a likelihood that the URL link is malicious or benign and blocking access to the URL link while generating a report.

Figure 1:
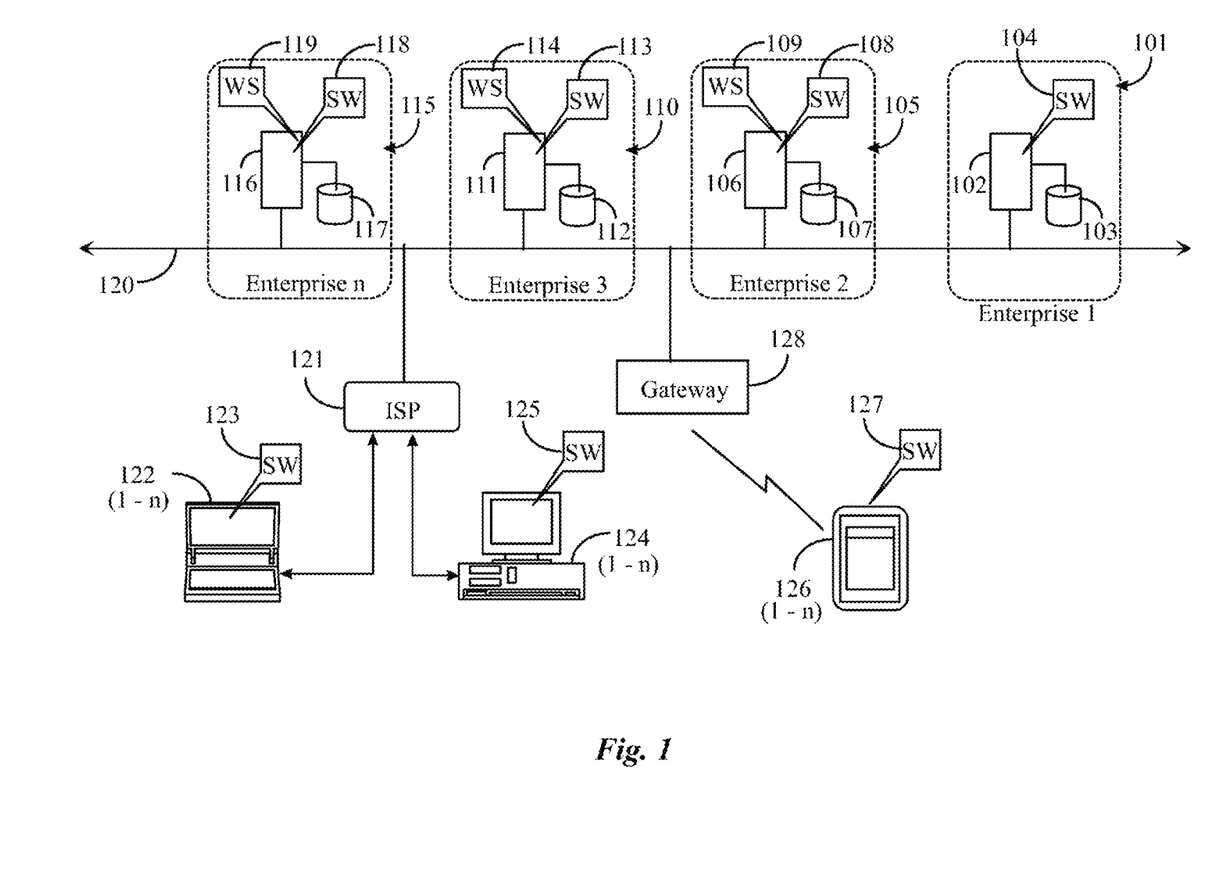
FIG. 1 illustrates an exemplary architectural diagram of a system in one embodiment of the real-time ransom and security breach detection and prevention system.

FIG. 1 is an architectural diagram of a system in one embodiment of the present invention. In FIG. 1 a plurality of enterprises or servers hosting digitized platforms that are interconnected in a wide area network represented by backbone 120. The network in many embodiments of the invention is the well-known Internet network, and backbone 120 may be considered the Internet backbone, representing all of the interconnected networks and subnetworks that make up the Internet. An enterprise 101 is shown connected to the network, with a server 102 executing software (SW) 104 coupled to a data repository 103. Enterprise 101 represents the controlling enterprise in many embodiments of the present invention.

A first enterprise labeled Enterprise 1 is shown, having a server 106 connected to the Internet and coupled to a data repository 107. Server 106 executes SW 108, and also presents on the network a web site (WS) 109. A second enterprise labeled Enterprise 2 is shown, having a server 111 connected to the Internet and coupled to a data repository 112. Server 111 executes SW 113, and also presents on the network a web site (WS) 114. A third enterprise labeled Enterprise n is shown, having a server 111 connected to the Internet and coupled to a data repository 117. Server 116 executes SW 118, and also presents on the network a web site (WS) 119.

Enterprise 1 is a singular platform providing data integration, digital tools and controls in many embodiments of the invention. Enterprises 2 through n represent any number of enterprises that may be interacting with Enterprise 1 and other enterprises in various aspects and circumstances in embodiments of the invention. In some specific cases these enterprises may be different systems or entities within various industries, such as, cloud service providers, billing services, private networks, and government and regulatory agencies.

In FIG. 1 a laptop computer 122 (1-*n*) executing SW 123 is shown connected to the Internet network through an Internet Service Provider (ISP) 121. Similarly, a desktop computer 124 (1-*n*) is shown also connected to the Internet through ISP 121. These computer platforms represent many such platforms that may be utilized by individuals, such as IT administrators, users, or employess, to access enterprises 2-*n* to perform their daily tasks (e.g., sending and receiving emails or other electronic messages containing links). A internet-connected device 126 (1-*n*) is also shown in FIG. 1 connecting to the internet through a gateway 128, representing any number of internet-connected devices that may be used by individuals to interact with individual ones of enterprises 1-n. Internet-connected device 126 may be any device such as, a personal digital assistant (PDA), desktop workstation, laptop or notebook computer, netbook, tablet, smart phone, smart watch or other wearable, appliance, part of the Internet-of-Things, TV, vehicle, and/or embedded system, to name a few non-limiting examples, or any combination thereof that is equipped with a web browser or electronic message application such as Outlook, Gmail, WebEx, Zoom, WhatsApp, Slack, etc.

System-Level

In the architecture of FIG. 1 at least one of the enterprises 2-n, represents a either a public or private enterprise Blockchain provider, such as for example, Ethereum, a public network, or Hyperledger Fabric, a private enterprise network, which may provide services in document/data creation, storage, and security.

In embodiments of the invention Enterprise 1 is a central hub of all services and interactions in the system. Also, in embodiments, Enterprise 1, through SW 104, provides a web site with a location identifier, Domain name and a URL, through which an electronic mail or messaging service, that is, essentially any person seeking to access a electronic mail or messaging service, may connect via a web browser or application, using a platform such as shown in FIG. 1 as elements 122, 124 and 126.

Figure 2:
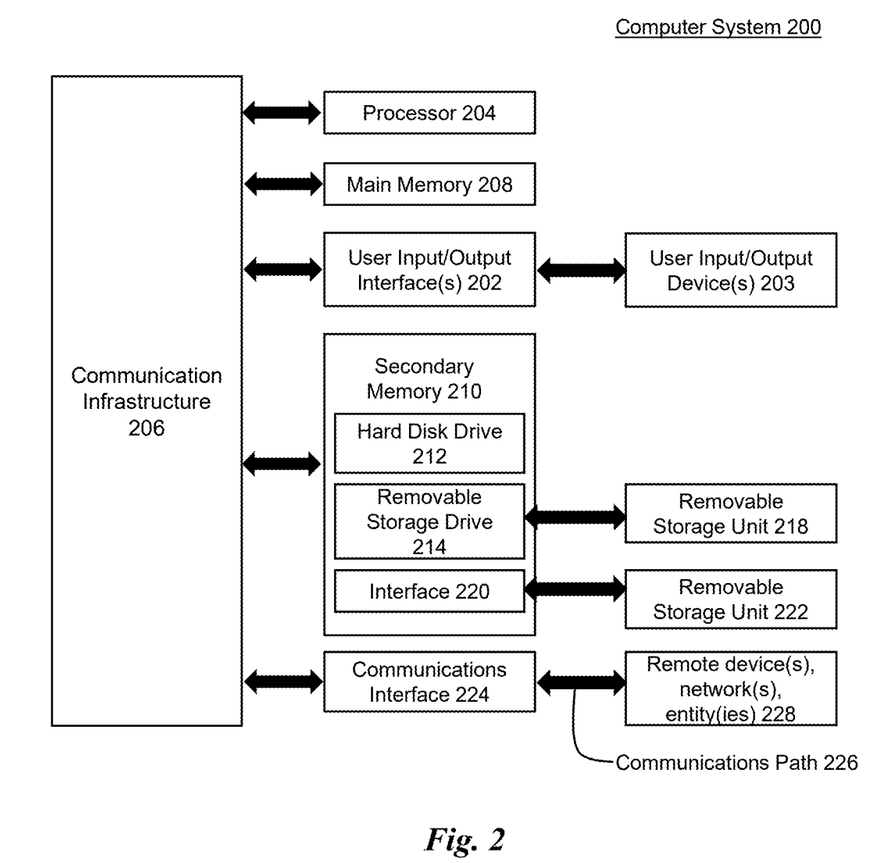
FIG. 2 illustrates an exemplary computer system useful for implementing various embodiments.

Various embodiments may be implemented, for example, using one or more well-known computer systems, such as computer system 200 shown in FIG. 2. One or more computer systems 200 may be used, for example, to implement any of the embodiments discussed herein, as well as combinations and sub-combinations thereof.

Computer system 200 may include one or more processors (also called central processing units, or CPUs), such as a processor 204. Processor 204 may be connected to a communication infrastructure or bus 206.

Computer system 200 may also include user input/output device(s) 203, such as monitors, keyboards, pointing devices, etc., which may communicate with communication infrastructure 206 through user input/output interface(s) 202.

One or more of processors 204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 200 may also include a main or primary memory 208, such as random access memory (RAM). Main memory 208 may include one or more levels of cache. Main memory 208 may have stored therein control logic (i.e., computer software) and/or data.

Computer system 200 may also include one or more secondary storage devices or memory 210. Secondary memory 210 may include, for example, a hard disk drive 212 and/or a removable storage device or drive 214. Removable storage drive 214 may be a floppy disk drive, a magnetic tape drive, a compact disk drive, an optical storage device, tape backup device, and/or any other storage device/drive.

Removable storage drive 214 may interact with a removable storage unit 218. Removable storage unit 218 may include a computer usable or readable storage device having stored thereon computer software (control logic) and/or data. Removable storage unit 218 may be a floppy disk, magnetic tape, compact disk, DVD, optical storage disk, and/any other computer data storage device. Removable storage drive 214 may read from and/or write to removable storage unit 218.

Secondary memory 210 may include other means, devices, components, instrumentalities or other approaches for allowing computer programs and/or other instructions and/or data to be accessed by computer system 200. Such means, devices, components, instrumentalities or other approaches may include, for example, a removable storage unit 222 and an interface 220. Examples of the removable storage unit 222 and the interface 220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 200 may further include a communication or network interface 224. Communication interface 224 may enable computer system 200 to communicate and interact with any combination of external devices, external networks, external entities, etc. (individually and collectively referenced by reference number 228). For example, communication interface 224 may allow computer system 200 to communicate with external or remote devices 228 over communications path 226, which may be wired and/or wireless (or a combination thereof), and which may include any combination of LANs, WANs, the Internet, etc. Control logic and/or data may be transmitted to and from computer system 200 via communication path 226.

Computer system 200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 200, main memory 208, secondary memory 210, and removable storage units 218 and 222, as well as tangible articles of manufacture embodying any combination of the foregoing. Such control logic, when executed by one or more data processing devices (such as computer system 200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 2. In particular, embodiments can operate with software, hardware, and/or operating system implementations other than those described herein.

In embodiments of the invention, the real-time ransom and security breach detection and prevention system 101 monitors and validates the URL links, API calls, documents, web code, and executable files that are received, opened, sent, attached, or downloaded by a user to prevent a cyber/ransomware attack, the real-time ransom and security breach detection and prevention system 101 does not allow access to a unauthorized URL link, API call, web code, or executable to prevent a security breach. The real-time ransom and security breach detection and prevention system 101 generates logs of the URL links, API calls, web code, and executables analyzed for future analysis.

The real-time ransom and security breach detection and prevention system 101 may provide a front-end user interface to allow users to create, send, receive, manage, edit, and/or modify electronic messages. The user interface may be a graphical user interface (GUI) that may be accessed and/or displayed on a user device 122, 124, and 126. Upon selecting the plugin, link, or widget, user device 122, 124, and 126 may use an application programming interface (API) to communicate with the real-time ransom and security breach detection and prevention system 101. Alternatively, the real-time ransom and security breach detection and prevention system 101 may operate solely on the client side of the system utilizing a plugin, application, or widget running locally on the client device. While running the real-time ransom and security breach detection and prevention system 101 on the server side may allow for the detection, analysis, blocking, and reporting of a URL link, API calls, documents, web code, and executable files within a private network by monitoring links as they move throughout the network, by operating the real-time ransom and security breach detection and prevention system 101 on the client side, the real-time ransom and security breach detection and prevention system 101 can handle traffic that may never circulate within the private network. Thus, protecting user device 122, 124, and/or 126 from other user devices 122, 124, and/or 126 that are not within the same enterprise 1-*n*.

As will be further explained below, real-time ransom and security breach detection and prevention system 101 allows a user to modify, send, receive, create, manage, and edit, documents, URL links, API calls, web code, and executable files. The real-time ransom and security breach detection and prevention system 101 also allows an administrator to manage user account information, account access, whitelists, blacklists, and security events through a dashboard.

Today malicious files (viruses, malware, ransomware, spyware, worms, and Trojan horses, etc.) originate primarily from phishing attacks. These phishing attacks typically target user through electronic messaging platforms, such as, Outlook, Gmail, WebEx, Zoom, WhatsApp, Slack, etc. When a user clicks, or selects, a link pertaining to a document, URL, domain, file, etc., the link contains and address that directs the user to a destination. Malicious actors use this fundamental navigation tool to embed an address corresponding to a malicious file. For example, while a user may see a URL link for "www.ikonpass.com," when selected, the actual linked address may lead to an internet-connected device where a malicious file is stored and upon selecting the URL link, the user may unknowingly download a malicious file or enter a virtual environment controlled by a malicious actor.

Using attack methods similar to the one described above, malicious actors primarily perform two types of attacks. First, they malicious actor uses the infected link to install malware that monitors the machine for authentication tokens. Once identified, the authentication token is stored. The malicious actor then uses this authentication token to access the system that the user was originally accessing. Once the malicious actor has access to the system, they can steal personal information, documents, etc., as well as perform a ransomware attack. The second type of attack redirects a user to a virtual environment of the malicious actor's design. This type of attack is sometimes referred to as DNS spoofing. This virtual environment may be a near exact replica of the intended website. Once there, the malicious actor monitors the unsuspecting user's activity until the desired login credentials, personal information, sensitive documents, etc. are accessed.

The real-time ransom and security breach detection and prevention system 101 authenticates links by generating hashes of the URL link, API calls, documents, web code, and executable files at various stages during the sending, receiving, pushing, pulling, and executing process of an electronic messaging platform and comparing the hashes to determine if the initial URL link, API calls, documents, web code, or executable files matches the accessed URL link, API calls, documents, web code, or executable files. As stated above, traditional systems require more computing power to run parsing programs in the background, or additional hardware running to parse the entire network to detect a cyber-attack threat. Due to this, these systems take 5-15 minutes to detect and take action. By comparing the generated hashes of URL link, API calls, documents, web code, or executable files, the real-time ransom and security breach detection and prevention system 101 can significantly speed up cyber threat detection while reducing processing requirements. In fact, the real-time ransom and security breach detection and prevention system 101 may be configured to provide client side cyber threat detection within at least one minute, but preferably within 30 seconds, more preferably within 1 second. While the real-time ransom and security breach detection and prevention system 101 will be described throughout using a traditional email platform and workflow, the present disclosure is not limited to only email platforms, the real-time ransom and security breach detection and prevention system 101 can be implemented within any communication channels, application, plug-in, widget, or platform where URL links, API calls, documents, web code, or executable are used. For example, a URL link may be sent using an instant messaging platform utilizing a web-plug-in, IOS application running API calls, or a web-based message portal running within an HTML environment.

Figure 3:
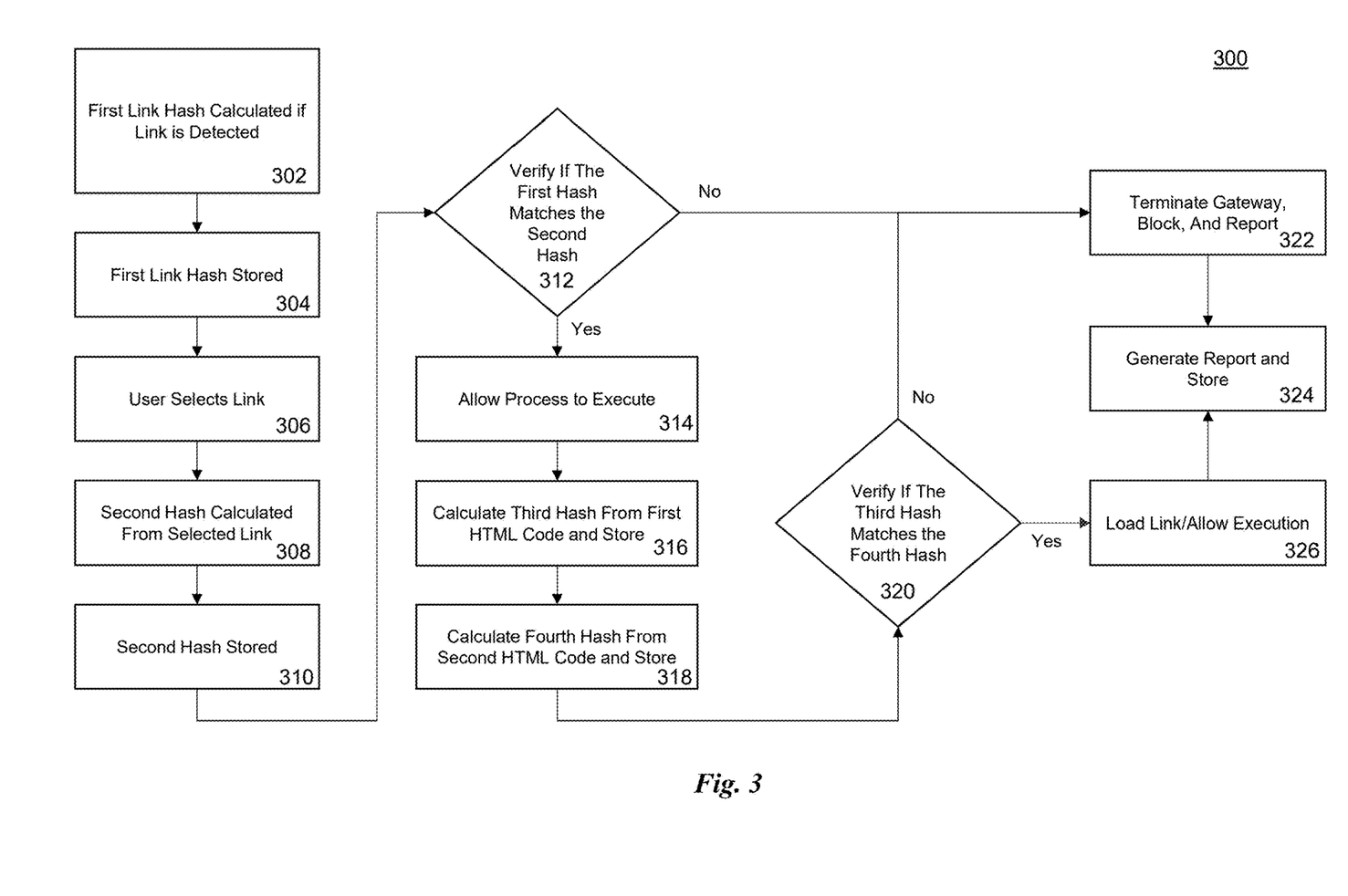
FIG. 3 illustrates an exemplary real-time ransom and security breach detection and prevention process.

FIG. 3 illustrates an exemplary real-time ransom and security breach detection and prevention process of the real-time ransom and security breach detection and prevention system 101. A user first receives an email via the real-time ransom and security breach detection and prevention system 101 running on user device 122, 124, or 126. Once the email is received, by the real-time ransom and security breach detection and prevention system 101, the email contents are analyzed, either client-side by processor 204 or server-side by server 102, to determine if any attachments or links are present. This process can be performed either before a user has opened the email or when a user opens the email. Once an attachment or link is detected, the real-time ransom and security breach detection and prevention system 101 generates a hash of the attachment or link at step 302. The hashing algorithm generates an alpha-numeric string that is unique to the source data. For example, in a Secure Hashing Algorithm (SHA) version 256 (SHA-256), the file contents or link is coded into a 256-bit length alpha-numeric string, where the string is typically 64-characters in length. Because each hash is unique, the real-time ransom and security breach detection and prevention system 101 can verify that the hashes, or strings, are either identical and verified, or that they are different and thus corrupt/malicious. Once a hash of the attachment or link is generated, this first hash is stored in memory 208, 210, or on a remote server through communications path 226 in step 304. The first hash is generated either before the user receives the email, or before the user interacts with the attachment or link, but after the user opens the email via a method such as an email extension. The term "link" is used generally throughout this disclosure, but can also be any URL link, API call, document, web code or portion of web code (such as HTML), or executable file.

At step 306, the user selects the link. Once selected, the link will redirect the user device 122, 124, or 126 to the embedded address, URL, IP address, domain, file location, etc. As stated above, the user does not know what this embed address, URL, IP address, domain, file location, etc. corresponds to. Simply put, the redirected link may be malicious in nature. The real-time ransom and security breach detection and prevention system 101 monitors this process and identifies the selected link's actual address. Once the selected link's actual address is identified by the real-time ransom and security breach detection and prevention system 101, the real-time ransom and security breach detection and prevention system 101 generates a second hash of the selected link's actual address. Once the second hash is generated, the real-time ransom and security breach detection and prevention system 101 stores the second hash within memory 208, 210, or on a remote server through communications path 226 in step 310.

After both the first and second hashes of the originally received link and the selected link are generated, the real-time ransom and security breach detection and prevention system 101 determines if the first hash matches the second hash in step 312. If the two hashes match, the real-time ransom and security breach detection and prevention system 101 marks the link as having a likelihood that the link is benign and proceeds to step 314 and allows the execution of the user selected link. If the two hashes do not match, the real-time ransom and security breach detection and prevention system 101 marks the link as having a high likelihood that the link is malicious and proceeds to step 322. At step 322, the real-time ransom and security breach detection and prevention system 101 terminates the internet gateway for the user device 122, 124, or 126 to prevent the user device 122, 124, or 126 from accessing the malicious link. During step 322, the real-time ransom and security breach detection and prevention system 101 also adds the link to a blacklist so that the link cannot be accessed by a user in the future.

In an embodiment, step 322 is handled by another enterprise 2-n operated by a third party that controls enterprise 1's gateway, EDR, email server, etc. Some examples of such enterprises 2-n are Microsoft Outlook, an email security gateway, firewall gateway, or isolated browser.

By example, if the original link received via email was for "www.google.com," but the embedded address, once selected, corresponded to "www.ransomwareattacker.com," where various malicious files were waiting, the real-time ransom and security breach detection and prevention system 101 would generate a first hash of the URL link "www.google.com" and a second hash of the URL link "www.ransomwareattacker.com." Once both hashes were generated, the real-time ransom and security breach detection and prevention system 101 would compare the two hashes and determine that there was a likelihood that the link was malicious and terminate the internet gateway and prevent the user from navigating to the malicious address.

Once the gateway is terminated, the real-time ransom and security breach detection and prevention system 101 generates a security event report at step 324 that contains various details pertaining to the security event, such as, the user who attempted to access the link, the time and date that of the access attempt, the link itself, a status of the security event, and an event classification.

While the above steps are capable of detecting malicious links that are readily available by inspecting the link addresses, link address are sometimes shortened or iterative. A shortened link address is a condensed link that contains the full link address embedded within. An iterative link is a link address that iterates every time it is accessed. Since both of these types of links change once selected, benign link addresses may be flagged as malicious. Additionally, malicious actors may also hide malicious files within other areas of webpage. For example, a malicious actor may hide malicious code within the web code of a webpage itself. Examples of such attacks are downloaders, droppers, loaders, .exe loading a DLL file, and others. Furthermore, a malicious actor may hide malicious code within ad space sold to third parties. In such an attack, the original web code for the webpage remains unchanged by the webpage's developer, but the portions of the web code pertaining to the sold ad space may include links to malicious files.

To combat these types of dynamic link address and attacks, the real-time ransom and security breach detection and prevention system 101, in an embodiment, performs a third hash of the web code in step 316 and stores the hash within memory 208, 210, or on a remote server through communications path 226. The web code can be any type of computer code. For example, java, HTML, pyton, C, C++, etc. During step 316, the real-time ransom and security breach detection and prevention system 101 can hash the entire webpage's web code, or only a portion of the webpage's web code.

After the third hash is generated using the webpage's web code, the real-time ransom and security breach detection and prevention system 101 analyzes the web code to determine if there is any state changes. A state change could be caused by embedded and malicious auto executable, or generated by any webpage activity such as, a user navigating to a new portion of the webpage, a call by the webpage to acquire third party ads. Once a state change is detected, the real-time ransom and security breach detection and prevention system 101 calculates a fourth hash from the webpage's web code in step 318. Once generated, the fourth hash is stored within memory 208, 210, or on a remote server through communications path 226. The real-time ransom and security breach detection and prevention system 101 can utilize these state changes to filter out benign activities that cause web code changes by adding known benign web code changes to a whitelist or by implementing a machine learning method that utilizes a database of the stored state changes and their ultimate classification of benign or malicious from comparing the hashes.

After both the third and fourth hashes of the web code are generated, the real-time ransom and security breach detection and prevention system 101 determines if the third hash matches the fourth hash in step 320. If the two hashes match, the real-time ransom and security breach detection and prevention system 101 marks the link/webpage as having a likelihood that the link is benign and proceeds to step 326 and allows the execution of the user selected link. If the two hashes do not match, the real-time ransom and security breach detection and prevention system 101 marks the link/webpage as having a high likelihood that the link is malicious and proceeds to step 322. At step 322, the real-time ransom and security breach detection and prevention system 101 terminates the internet gateway for the user device 122, 124, or 126 to prevent the user device 122, 124, or 126 from accessing the malicious link/webpage. During step 322, the real-time ransom and security breach detection and prevention system 101 also adds the link/webpage to a blacklist so that the link/webpage cannot be accessed by a user in the future.

While two sets of real-time ransom and security breach detection and prevention processes are described above for step 302-326, the real-time ransom and security breach detection and prevention system 101 can perform one, both, or any number of real-time ransom and security breach detection and prevention processes and in any order when determining if a link is valid.

As explained above, the real-time ransom and security breach detection and prevention system 101 can utilize various methods to detect links within an email. Some examples are, a plug-in/extension running within a web browser, an email extension, an API based system like Office.js, or an email server filtering system running server-side and parsing emails as they are received and filtered.

Figure 4:
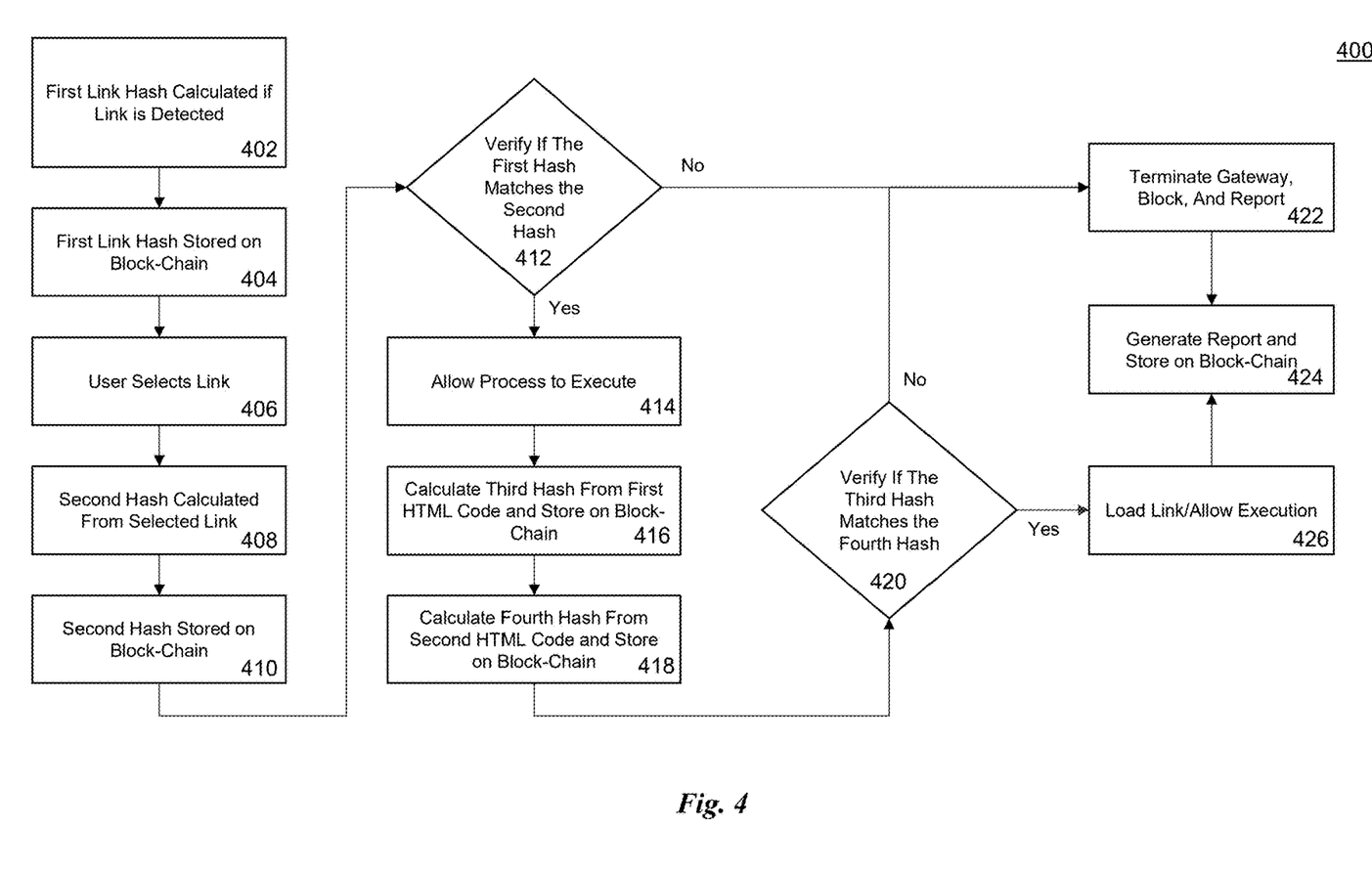
FIG. 4 illustrates an exemplary real-time ransom and security breach detection and prevention process that incorporates the use of a decentralized distributed block chain ledger.

FIG. 4 illustrates an exemplary real-time ransom and security breach detection and prevention process of the real-time ransom and security breach detection and prevention system 101 implemented on a block chain. A user first receives an email via the real-time ransom and security breach detection and prevention system 101 running on user device 122, 124, or 126. Once the email is received, by the real-time ransom and security breach detection and prevention system 101, the email contents are analyzed, either client-side by processor 204 or server-side by server 102, to determine if any attachments or links are present. This process can be performed either before a user has opened the email or when a user opens the email. Once an attachment or link is detected, the real-time ransom and security breach detection and prevention system 101 generates a hash of the attachment or link at step 402. The hashing algorithm generates an alpha-numeric string that is unique to the source data. For example, in a Secure Hashing Algorithm (SHA) version 256 (SHA-256), the file contents or link is coded into a 256-bit length alpha-numeric string, where the string is typically 64-characters in length. Because each hash is unique, the real-time ransom and security breach detection and prevention system 101 can verify that the hashes, or strings, are either identical and verified, or that they are different and thus corrupt/malicious. Once a hash of the attachment or link is generated, this first hash is stored in on a decentralized block chain ledger (any of enterprise 1-*n*) in step 404. The first hash is generated either before the user receives the email, or before the user interacts with the attachment or link. The term "link" is used generally throughout this disclosure, but can also be any URL link, API call, document, web code or portion of web code (such as HTML), or executable file.

Publishing the generated hashes onto the block chain may preserve the trustworthiness of the data and the legitimacy of the data's content. For example, the immutable nature of a block chain may protect against unauthorized data modifications or tampering. Further, the cryptographic hash may preserve privacy and may prevent other users of the block chain from viewing confidential information. This allows for greater security as the stored hashes corresponding to the links to be validated are not stored locally and in a manner that is susceptible to malicious actors.

At step 406, the user selects the link. Once selected, the link will redirect the user device 122, 124, or 126 to the embedded address, URL, IP address, domain, file location, etc. As stated above, the user does not know what this embed address, URL, IP address, domain, file location, etc. corresponds to. Simply put, the redirected link may be malicious in nature. The real-time ransom and security breach detection and prevention system 101 monitors this process and identifies the selected link's actual address. Once the selected link's actual address is identified by the real-time ransom and security breach detection and prevention system 101, the real-time ransom and security breach detection and prevention system 101 generates a second hash of the selected link's actual address. Once the second hash is generated, the real-time ransom and security breach detection and prevention system 101 stores the second hash on a decentralized block chain ledger (any of enterprise 1-*n*) in step 410.

After both the first and second hashes of the originally received link and the selected link are generated, the real-time ransom and security breach detection and prevention system 101 determines if the first hash matches the second hash in step 412. If the two hashes match, the real-time ransom and security breach detection and prevention system 101 marks the link as having a likelihood that the link is benign and proceeds to step 414 and allows the execution of the user selected link. If the two hashes do not match, the real-time ransom and security breach detection and prevention system 101 marks the link as having a high likelihood that the link is malicious and proceeds to step 422. At step 422, the real-time ransom and security breach detection and prevention system 101 terminates the internet gateway for the user device 122, 124, or 126 to prevent the user device 122, 124, or 126 from accessing the malicious link. During step 422, the real-time ransom and security breach detection and prevention system 101 also adds the link to a blacklist so that the link cannot be accessed by a user in the future.

In an embodiment, step 422 is handled by another enterprise 2-*n* operated by a third party that controls enterprise 1's gateway, EDR, email server, etc. Some examples of such enterprises 2-*n* are Microsoft Outlook, an email security gateway, firewall gateway, or isolated browser.

By example, if the original link received via email was for "www.google.com," but the embedded address, once selected, corresponded to "www.ransomwareattacker.com," where various malicious files were waiting, the real-time ransom and security breach detection and prevention system 101 would generate a first hash of the URL link "www.google.com" and a second hash of the URL link "www.ransomwareattacker.com." Once both hashes were generated, the real-time ransom and security breach detection and prevention system 101 would compare the two hashes and determine that there was a likelihood that the link was malicious and terminate the internet gateway and prevent the user from navigating to the malicious address.

Once the gateway is terminated, the real-time ransom and security breach detection and prevention system 101 generates a security event report at step 424 that contains various details pertaining to the security event, such as, the user who attempted to access the link, the time and date the of the access attempt, the link itself, a status of the security event, and an event classification.

While the above steps are capable of detecting malicious links that are readily available by inspecting the link addresses, link address are sometimes shortened or iterative. A shortened link address is a condensed link that contains the full link address embedded within. An iterative link is a link address that iterates every time it is accessed. Since both of these types of links change once selected, benign link addresses may be flagged as malicious. Additionally, malicious actors may also hide malicious files within other areas of webpage. For example, a malicious actor may hide malicious code within the web code of a webpage itself. Examples of such attacks are downloaders, droppers, loaders, .exe loading a DLL file, and others. Furthermore, a malicious actor may hide malicious code within ad space sold to third parties. In such an attack, the original web code for the webpage remains unchanged by the webpage's developer, but the portions of the web code pertaining to the sold ad space may include links to malicious files.

To combat these types of dynamic link address and attacks, the real-time ransom and security breach detection and prevention system 101, in an embodiment, performs a third hash of the web code in step 416 and stores the hash on a decentralized block chain ledger (any of enterprise 1-n). The web code can be any type of computer code. For example, java, HTML, pyton, C, C++, etc. During step 416, the real-time ransom and security breach detection and prevention system 101 can hash the entire webpage's web code, or only a portion of the webpage's web code.

After the third hash is generated using the webpage's web code, the real-time ransom and security breach detection and prevention system 101 analyzes the web code to determine if there is any state changes. A state change could be generated by any webpage activity such as, a user navigating to a new portion of the webpage, a call by the webpage to acquire third party ads, or the running of an executable file. Once a state change is detected, the real-time ransom and security breach detection and prevention system 101 calculates a fourth hash from the webpage's web code in step 418. Once generated, the fourth hash is stored on a decentralized block chain ledger (any of enterprise 1-n).

After both the third and fourth hashes of the web code are generated, the real-time ransom and security breach detection and prevention system 101 determines if the third hash matches the fourth hash in step 420. If the two hashes match, the real-time ransom and security breach detection and prevention system 101 marks the link/webpage as having a likelihood that the link is benign and proceeds to step 426 and allows the execution of the user selected link. If the two hashes do not match, the real-time ransom and security breach detection and prevention system 101 marks the link/webpage as having a high likelihood that the link is malicious and proceeds to step 422. At step 422, the real-time ransom and security breach detection and prevention system 101 terminates the internet gateway for the user device 122, 124, or 126 to prevent the user device 122, 124, or 126 from accessing the malicious link/webpage. During step 422, the real-time ransom and security breach detection and prevention system 101 also adds the link/webpage to a blacklist so that the link/webpage cannot be accessed by a user in the future.

In an embodiment, the real-time ransom and security breach detection and prevention system 101 may need to add additional preventative measures to further limit the risk of malicious auto executable attacks from running long enough to infect the system. For example, the duration between the third hash and fourth hash can be controlled to minimize the risk by implementing a timer that when reached, will automatically terminate the gateway. Another potential solution is the inclusion of a fifth hash. The fifth hash is generated using a timer that is started after the generation of the fourth hash. This allows the fifth hash to be generated after a period of time such that the fifth hash will be generated once the web code has experienced another state change.

While two sets of real-time ransom and security breach detection and prevention processes are described above for step 402-426, the real-time ransom and security breach detection and prevention system 101 can perform one, both, or any number of real-time ransom and security breach detection and prevention processes and in any order when determining if a link is valid.

As explained above, the real-time ransom and security breach detection and prevention system 101 can utilize various methods to detect links within an email. Some examples are, a plug-in/extension running within a web browser, an email extension, an API based system like Office.js, or an email server filtering system running server-side and parsing emails as they are received and filtered.

In an embodiment, the real-time ransom and security breach detection and prevention system 101 may provide to the user, or IT administrator, a real-time notification (not shown) of the likelihood that the link is malicious or benign. The notification may allow the security event report to be escalated to the IT administrator for immediate review. Additionally, the notification may indicate that the link was a shortened or iterative link and further ask the user if they still wish to access the link.

Figure 5:
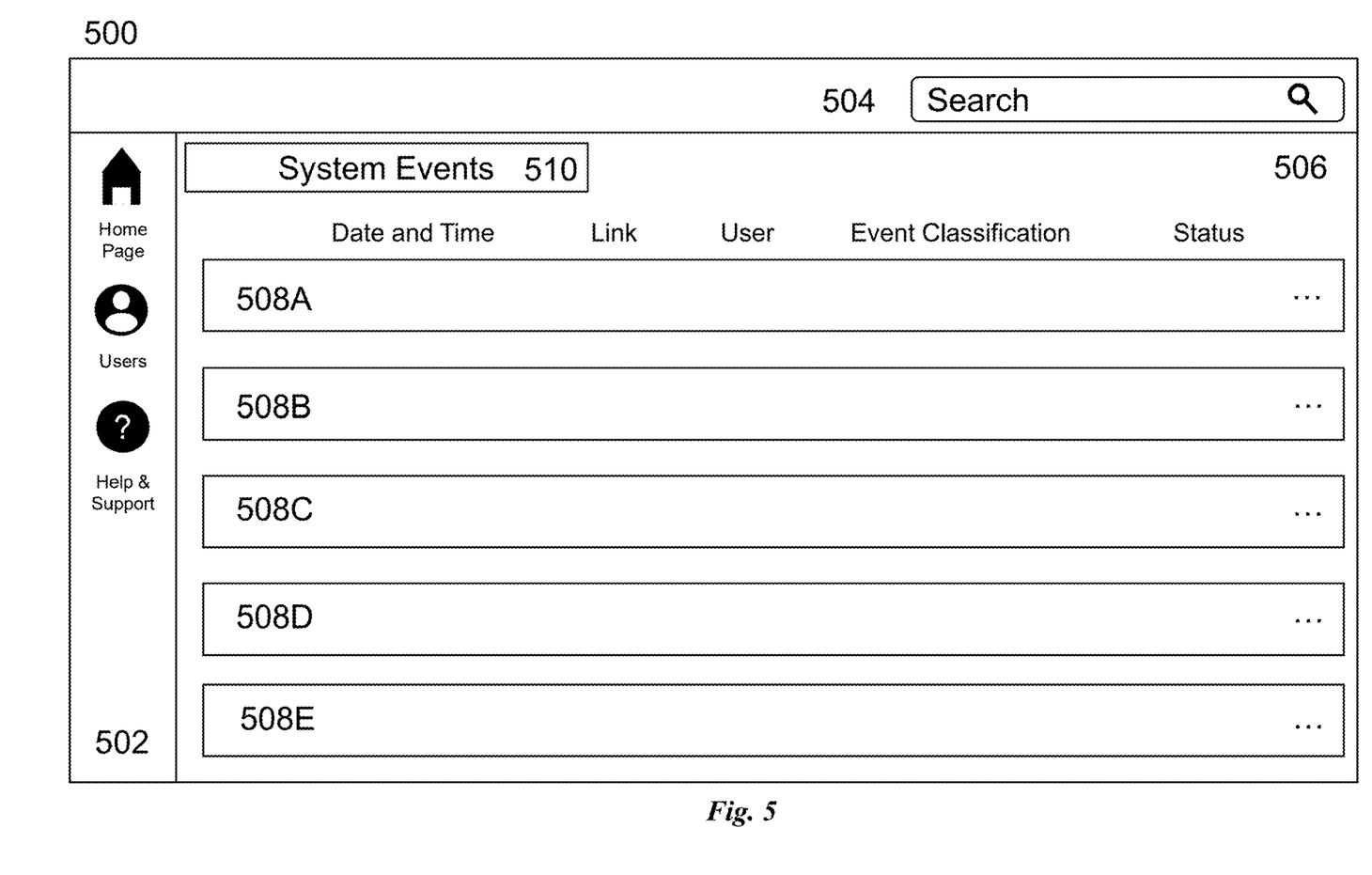
FIG. 5 illustrates an exemplary display for a monitoring dashboard of the real-time ransom and security breach detection and prevention system.

In embodiments, the real-time ransom and security breach detection and prevention system 101 includes a dashboard designed for IT administrators. Representations of this dashboard are illustrated in FIG. 5. The real-time ransom and security breach detection and prevention system 101 generates the panels illustrated in FIG. 5 using the security event reports generated and stored in steps 324 and 424. The security event reports can be stored locally within memory 208 or 210, or contained within one of the enterprises 1-n. The security event dashboard 500 provides IT administrators with the resources and information needed to provide effective and efficient diagnosis of each security threat recorded. GUI tab 502 includes GUI buttons (Home Page, Users, Help & Support, etc.) that allow IT administrators to navigate various areas of the real-time ransom and security breach detection and prevention system 101's security event dashboard. For example, if "Users" is selected, a new page is displayed, not shown, that summarizes all of the information pertinent to the Users currently signed in, such as, personalized user security event lists, notifications, etc. If "Help & Support" is selected, a new page is displayed, not shown, that contains information such as, troubleshooting tips, support text chat, IT text chat, help documents, contact information, etc.

In embodiments of the invention, when a user selects the "Home Page" icon, panel 506 is displayed. Panel 506 displays a list of all security events detected and stored by the real-time ransom and security breach detection and prevention system 101. The "Home Page" can be configured to show all security events, even benign events, or acts exclusively as a quarantine zone containing only security events that have a likelihood that they are malicious in nature. Each entry 508A-508E contain a summary of the security event's data. For example, entries 508A-508E includes the date and time of the security event, the link address, the user affected, status of the security event, a classification of the security event, etc. Entries 508A-508D can be searched for using search bar 504. A IT administrator can also add new security events using GUI button 510. Upon the selection of GUI button 510, a new graphical element, not shown, is displayed that contains various electronic data entry fields. The electronic data entry fields prompt an IT administrator to enter in security event data such as, the link address, the user affected, status of the security event, a classification of the security event, etc.

In embodiments of the invention, the real-time ransom and security breach detection and prevention system 101's entries 508A-508E can be selected, which causes a detailed report to be displayed, not shown. The detailed report can allow the IT administrator to update data contained within the security event report, such as, the link address, the user affected, status of the security event, a classification of the security event, etc. The IT administrator can also add or remove security events for the either the whitelist or blacklist. Furthermore, an IT administrator can also manually review, clear, and classify security events.

In embodiments of the invention, the real-time ransom and security breach detection and prevention system 101's event classifications and status can be updated and maintain automatically using machine learning algorithms designed to identify the type of security attack and they type of information targeted. The real-time ransom and security breach detection and prevention system 101 can utilize these event classifications to further improve the web code state change identification process. An IT administrator may utilize the manual review to generate a training database for the real-time ransom and security breach detection and prevention system 101's machine learning algorithm.

Various embodiments throughout have been described using a blockchain and blockchain elements. In an embodiment, the real-time ransom and security breach detection and prevention system 101 is implemented without the use of a blockchain. To ensure network and data security, traditional methods of securing a data network may be used, such as, encryption.

While the real-time ransom and security breach detection and prevention system 101 is described throughout using a traditional email platform and workflow, the present disclosure is not limited to only email platforms, the real-time ransom and security breach detection and prevention system 101 can be implemented within any communication channels, application, plug-in, widget, or platform where URL links, API calls, documents, web code, or executable are used. For example, a URL link may be sent using an instant messaging platform utilizing a web-plug-in, IOS application running API calls, or a web-based message portal running within an HTML environment. Furthermore, the real-time ransom and security breach detection and prevention system 101 can be implemented within additional cyber security systems and communication mechanisms, such as Bluetooth, WIFI 2-7, etc. by generating a first hash of authentication tokens during the initial connecting/registration phase and comparing that initial hash to a second hash of the authentication token provided by a device at a future point in time. Authentication tokens can include various types of information that may be dynamic or specific to an individual's account or device. Additionally, requests for authentication tokens may also request additional information. For example, during a log-in attempt, a server may request the authentication token and additional information such as, the device's MAC address, IP address, a date-timestamp, 2FA code, region code, etc. that additionally identify the user's device. By including this additional information within the hash when a hash is generated during the initial phase, the first hash will be unique to the user/session and prevent a malicious actor from simply capturing the authentication token to gain access to the system/service. For example, when implemented within a password manager, the real-time ransom and security breach detection and prevention system 101 may hash the authentication token along with additional information such as the username, device's MAC address, IP address, 2FA code, a date-timestamp, region code, etc. to ensure the first hash is unique. By doing so, if the malicious actor attempts to utilize just the captured authentication token, the malicious actor's second generated hash will not match the first hash. For this example, the real-time ransom and security breach detection and prevention system 101 is running server-side and validates the first and second hashes when a subsequent access attempt is initiated.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
receiving, by one or more internet-connected devices, a link;
storing, by the one or more internet-connected devices, the link;
in response to receiving the link, generating a first hash of the link;
storing, by the one or more internet-connected devices, the first hash;
receiving, via the one or more internet-connected devices, a user selection of the link;
in response to receiving the user selection of the link, generating a second hash of the selected link, wherein the second hash of the selected link is generated using the selected link;
storing, by the one or more internet-connected devices, the second hash;
analyzing, by the one or more internet-connected devices, the first hash and second hash to determine that the link is malicious or benign, wherein the link is determined to be malicious if the first hash does not match the second hash;
terminating, by the one or more internet-connected devices, a link redirection of the user selected link based on a first determination that the link is malicious or benign, wherein the first determination is based on the analyzing the first hash and the second hash;
in response to analyzing the first hash and second hash, displaying, by the one or more internet-connected devices, a notification, wherein the notification is based on the first determination that the link is malicious or benign;
generating, by the one or more internet-connected devices, a third hash, wherein the third hash is generated using the selected link's a first HTML code;
storing, by the one or more internet-connected devices, the third hash;
in response to generating the third hash, generating a fourth hash, wherein the fourth hash is generated using a second HTML code;
storing, by the one or more internet-connected devices, the fourth hash;
analyzing, by the one or more internet-connected devices, the third hash and fourth hash to determine that the link's HTML code is malicious or benign, wherein the link's HTML code is determined to be malicious if the third hash does not match the fourth hash;
terminating, by the one or more internet-connected devices, a gateway of the user selected link based on a second determination that the link is malicious or benign, wherein the second determination is based on the analyzing the third hash and the fourth hash;
in response to analyzing the third hash and fourth hash, displaying, by the one or more internet-connected devices, a notification, wherein the notification is based on the second determination that the link is malicious or benign;
parsing, by the one or more internet-connected devices, the first HTML code;
determining if the parsed first HTML code includes an embedded executable;
in response to determining if the parsed first HTML code includes an embedded executable, terminating, by the one or more internet-connected devices, a gateway of the user selected link based the second determination that the link is malicious or benign.

2. The computer implemented method of claim 1, further comprising:
in response to analyzing the first hash and second hash, generating a first report entry based upon the first hash, the second hash, link, and the first determination that the link is malicious or benign.

3. The computer implemented method of claim 1, further comprising:
in response to analyzing the third hash and fourth hash, generating a second report entry based upon the third hash, the fourth hash, link, and the second determination that the link is malicious or benign.

4. The computer implemented method of claim 1, further comprising:
storing, by the one or more internet-connected devices, the first hash, the second hash, link, and the first determination that the link is malicious or benign on a decentralized block-chain ledger.

5. The computer implemented method of claim 1, further comprising:
storing, by the one or more internet-connected devices, the third hash, the fourth hash, link, and the second determination that the link is malicious or benign on a decentralized block-chain ledger.

6. The computer implemented method of claim 1, further comprising:
displaying, by a server, a web portal, wherein the web portal includes a dashboard, wherein the dashboard is generated by the first hash, the second hash, link, the first determination that the link is malicious or benign, and the first report entry.

7. The computer implemented method of claim 1, further comprising:
displaying, by a server, a web portal, wherein the web portal includes a dashboard, wherein the dashboard is generated by the third hash, the fourth hash, link, the second determination that the link is malicious or benign, and the second report entry.

8. A ransom and security breach detection and prevention system, comprising:
one or more internet-connected devices,
wherein each of the one or more internet-connected devices, are configured to:
receive, by one or more internet-connected devices, a link;
store, by the one or more internet-connected devices, the link;
in response to receiving the link, generating a first hash of the link;
store, by the one or more internet-connected devices, the first hash;
receive, via the one or more internet-connected devices, a user selection of the link;

in response to receiving the user selection of the link, generating a second hash of the selected link, wherein the second hash of the selected link is generated using the selected link;
store, by the one or more internet-connected devices, the second hash;
analyze, by the one or more internet-connected devices, the first hash and second hash to determine that the link is malicious or benign, wherein the link is determined to be malicious if the first hash does not match the second hash;
terminate, by the one or more internet-connected devices, a link redirection of the user selected link based on a first determination that the link is malicious or benign, wherein the first determination is based on the analyzing the first hash and the second hash;
in response to analyzing the first hash and second hash, displaying, by the one or more internet-connected devices, a notification, wherein the notification is based on the first determination that the link is malicious or benign;
generate, by the one or more internet-connected devices, a third hash, wherein the third hash is generated using the selected link's a first HTML code;
store, by the one or more internet-connected devices, the third hash;
in response to generating the third hash, generate a fourth hash, wherein the fourth hash is generated using a second HTML code;
store, by the one or more internet-connected devices, the fourth hash;
analyze, by the one or more internet-connected devices, the third hash and the fourth hash to determine that the link's HTML code is malicious or benign, wherein the link's HTML code is determined to be malicious if the third hash does not match the fourth hash;
terminate, by the one or more internet-connected devices, a gateway of the user selected link based a second determination that the link is malicious or benign, wherein the second determination is based on the analysis of the third hash and the fourth hash;
parse, by the one or more internet-connected devices, the first HTML code;
determine if the parsed first HTML code includes an embedded executable; and
in response to the determination if the parsed first HTML code includes an embedded executable, terminate, by the one or more internet-connected devices, a gateway of the user selected link based the second determination that the link is malicious or benign.

9. The ransom and security breach detection and prevention system of claim 8, further comprising:
in response to analyzing the first hash and second hash, generating a first report entry based upon the first hash, the second hash, link, and the first determination that the link is malicious or benign.

10. The ransom and security breach detection and prevention system of claim 8, further comprising:
in response to analyzing the third hash and fourth hash, generating a second report entry based upon the third hash, the fourth hash, link, and the second determination that the link is malicious or benign.

11. The ransom and security breach detection and prevention system of claim 8, further comprising:
storing, by the one or more internet-connected devices, the first hash, the second hash, link, and the first determination that the link is malicious or benign on a decentralized block-chain ledger.

12. The ransom and security breach detection and prevention system of claim 8 further comprising:
storing, by the one or more internet-connected devices, the third hash, the fourth hash, link, and the second determination that the link is malicious or benign on a decentralized block-chain ledger.

13. The ransom and security breach detection and prevention system of claim 8, further comprising:
displaying, by a server, a web portal, wherein the web portal includes a dashboard, wherein the dashboard is generated by the first hash, the second hash, link, the first determination that the link is malicious or benign, and the first report entry.

14. The ransom and security breach detection and prevention system of claim 8, further comprising:
displaying, by a server, a web portal, wherein the web portal includes a dashboard, wherein the dashboard is generated by the third hash, the fourth hash, link, the second determination that the link is malicious or benign, and the second report entry.

15. A non-transitory computer-readable device having instructions stored thereon that, when executed by at least one computing device, cause the at least one computing device to perform operations comprising:
receiving, by one or more internet-connected devices, a link;
storing, by the one or more internet-connected devices, the link;
in response to receiving the link, generating a first hash of the link;
storing, by the one or more internet-connected devices, the first hash;
receiving, via the one or more internet-connected devices, a user selection of the link;
in response to receiving the user selection of the link, generating a second hash of the selected link, wherein the second hash of the selected link is generated using the selected link;
storing, by the one or more internet-connected devices, the second hash;
analyzing, by the one or more internet-connected devices, the first hash and second hash to determine that the link is malicious or benign, wherein the link is determined to be malicious if the first hash does not match the second hash;
terminating, by the one or more internet-connected devices, a link redirection of the user selected link based on a first determination that the link is malicious or benign, wherein the first determination is based on the analyzing the first hash and the second hash;
in response to analyzing the first hash and second hash, displaying, by the one or more internet-connected devices, a notification, wherein the notification is based on the first determination that the link is malicious or benign;
generating, by the one or more internet-connected devices, a third hash, wherein the third hash is generated using the selected link's a first HTML code;
storing, by the one or more internet-connected devices, the third hash;
in response to generating the third hash, generating a fourth hash, wherein the fourth hash is generated using a second HTML code;
storing, by the one or more internet-connected devices, the fourth hash;
analyzing, by the one or more internet-connected devices, the third hash and fourth hash to determine that the link's HTML code is malicious or benign, wherein the link's HTML code is determined to be malicious if the third hash does not match the fourth hash;

terminating, by the one or more internet-connected devices, a gateway of the user selected link based a second determination that the link is malicious or benign, wherein the second determination is based on the analyzing the third hash and the fourth hash;

in response to analyzing the third hash and fourth hash, displaying, by the one or more internet-connected devices, a notification, wherein the notification is based on the second determination that the link is malicious or benign;

parsing, by the one or more internet-connected devices, the first HTML code;

determining if the parsed first HTML code includes an embedded executable; and in response to determining if the parsed first HTML code includes an embedded executable, terminating, by the one or more internet-connected devices, a gateway of the user selected link based the second determination that the link is malicious or benign.

16. The non-transitory computer-readable device of claim 15, further comprising:

in response to analyzing the first hash and second hash, generating a first report entry based upon the first hash, the second hash, link, and the first determination that the link is malicious or benign.

17. The non-transitory computer-readable device of claim 15, further comprising:

in response to analyzing the third hash and fourth hash, generating a second report entry based upon the third hash, the fourth hash, link, and the second determination that the link is malicious or benign.

18. The non-transitory computer-readable device of claim 15, further comprising:

storing, by the one or more internet-connected devices, the first hash, the second hash, link, and the first determination that the link is malicious or benign on a decentralized block-chain ledger.

19. The non-transitory computer-readable device of claim 15, further comprising:

storing, by the one or more internet-connected devices, the third hash, the fourth hash, link, and the second determination that the link is malicious or benign on a decentralized block-chain ledger.

20. The non-transitory computer-readable device of claim 15, further comprising:

displaying, by a server, a web portal, wherein the web portal includes a dashboard, wherein the dashboard is generated by the first hash, the second hash, link, the first determination that the link is malicious or benign, and the first report entry.

21. The non-transitory computer-readable device of claim 15, further comprising:

displaying, by a server, a web portal, wherein the web portal includes a dashboard, wherein the dashboard is generated by the third hash, the fourth hash, link, the second determination that the link is malicious or benign, and the second report entry.

\* \* \* \* \*